United States Patent [19]

Martinello et al.

[11] Patent Number: 5,270,021
[45] Date of Patent: Dec. 14, 1993

[54] VARIABLE CONFIGURATION MEMBRANE FOR HIGH CAPACITY AUTOCLAVES

[76] Inventors: Ermanno Martinello; Michele Martinello, both of Via E. Fermi, 27, 35020 - Legnaro (Padova), Italy

[21] Appl. No.: 943,402

[22] Filed: Sep. 10, 1992

[30] Foreign Application Priority Data

Sep. 17, 1991 [IT] Italy .................. MI91 A 02448

[51] Int. Cl.$^5$ .................................................. A61L 2/00
[52] U.S. Cl. .................................. 422/294; 422/295; 422/296
[58] Field of Search ...................... 422/294, 295, 296

[56] References Cited

U.S. PATENT DOCUMENTS

| | | | |
|---|---|---|---|
| 3,114,599 | 12/1963 | Fanning | 422/294 |
| 3,476,506 | 11/1969 | Andersen et al. | 422/294 |
| 4,251,482 | 2/1981 | Sanderson et al. | 422/26 |
| 4,552,720 | 11/1985 | Baker, Sr. et al. | 422/26 |
| 4,992,217 | 2/1991 | Spinello | 422/294 |
| 5,082,636 | 1/1992 | Andersen | 422/294 |
| 5,118,471 | 6/1992 | Andersen et al. | 422/34 |

*Primary Examiner*—James C. Housel
*Assistant Examiner*—N. Bhat
*Attorney, Agent, or Firm*—Bucknam and Archer

[57] ABSTRACT

A membrane for autoclaves comprises a hollow elastomeric membrane body including a bottom portion mating with the bottom of the autoclave vessel, and a top portion including upwardly extending tubular lugs, the membrane body being made by any suitable injection molding method.

6 Claims, 3 Drawing Sheets

VARIABLE CONFIGURATION MEMBRANE FOR HIGH CAPACITY AUTOCLAVES

BACKGROUND OF THE INVENTION

The present invention relates to a variable configuration membrane, for high capacity autoclaves, and to a method for making the membrane.

As is known, in the hydraulic system field providing for the use of one or more autoclaves there are at present used, mainly, either fixed or inter-exchangeable membrane autoclaves.

In fact, while the air-cushion autoclaves have a longer duration and easier maintenance characteristics, the membrane autoclaves allow very large water amounts to be used.

In this connection it should be moreover pointed out that this broadly diffused use of membrane autoclaves is also due to the fact that, by properly designing the membrane, the operations of the pumps and, accordingly, the closure and opening surge currents can be greatly reduced.

Actually, as an autoclave system is operated, the membrane operates in a continuous way, with alternate expansion and compression cycles.

Thus, the life or time duration of such an autoclave will strictly depend on that of the membrane, since the latter will be the first to fail.

By exploiting the properties of elastomeric materials prior membranes have been constructed with a size much smaller than that of the vessel containing them.

Another aspect to be pointed out is that the autoclave manufacturers tend to design the modern autoclaves vessels with increasing diameters so as to increase the operating capacity thereof.

At present these high capacity autoclave systems include simple cylindric configuration autoclave vessels and the autoclave membranes are provided, at their bottom end, with a flange therethrough water can pass and, at their top end, with a hole for engaging the membrane to the metal vessel of the autoclave.

Moreover, the above membranes usually work in a vertical attitude and as they are filled by liquid as the autoclave is operated, the will assume, because of the gravity effect, a configuration projecting at the bottom, like that of a pear.

Under these conditions, great stresses of dynamic nature are generated, since the bottom of the membrane is thinned so as to fit the autoclave bottom.

The thinned membrane portion, moreover, will rub against the raw metal material of the autoclave vessel, so that the membrane can be torn.

Another portion of the membrane, also subjected to a great stress, is the portion thereof which is provided for connection to the top of the autoclave vessel, which is greatly stretched, since it must support the overall weight of the loaded water in addition to that of the membrane.

Another aspect to be considered, finally, is that the molding of great size rubber or elastomeric material articles involves the use of large size making systems and apparatus, which are consequently very expensive and which usually exploit the pressure molding technique.

The operation and maintenance of these large size pressure molding systems involve correspondingly high capital costs, as well a very long time for designing and testing optimum operation cycles and efficiently operating maintenance devices.

Moreover, in a pressure molding system, the end result is always related to the manual and mental skillness of the operator, and moreover such a pressure molding system generates high amounts of waste.

SUMMARY OF THE INVENTION

Accordingly, the aim of the present invention is to overcome the above mentioned drawbacks, by providing a high capacity autoclave membrane which has substantially the same size as the autoclave.

Within the scope of the above mentioned aim, a main object of the present invention is to provide such a high capacity autoclave membrane which is so designed as to reduce to a minimum the stresses which can be exerted thereon during the operation of the autoclave, so as to provide a long duration autoclave system.

Another object of the present invention is to provide such a high capacity autoclave membrane which can be made by methods adapted to provide the membrane with very good and even qualitative properties as well as a very reliable operation.

According to one aspect of the present invention, the above mentioned aim and objects, as well as yet other objects, which will become more apparent hereinafter, are achieved by a high capacity autoclave membrane characterized in that said membrane comprises a hollow elastomeric membrane body, provided with a bottom portion having the same size as the bottom of the autoclave vessel and with a top portion including upwardly extending tubular lugs.

This elastomeric body, which has a composite configuration, is advantageously made by a conventional type of injection molding method.

BRIEF DESCRIPTION OF THE DRAWINGS

Further characteristics and advantages of the membrane for autoclaves according to the present invention will become more apparent from the following detailed disclosure of a preferred, though not exclusive, embodiment thereof which is illustrated, by way of an indicative but not limitative example, in the figures of the accompanying drawings, where.

DESCRIPTION OF THE PREFERRED EMBODIMENTS

Figure 1:
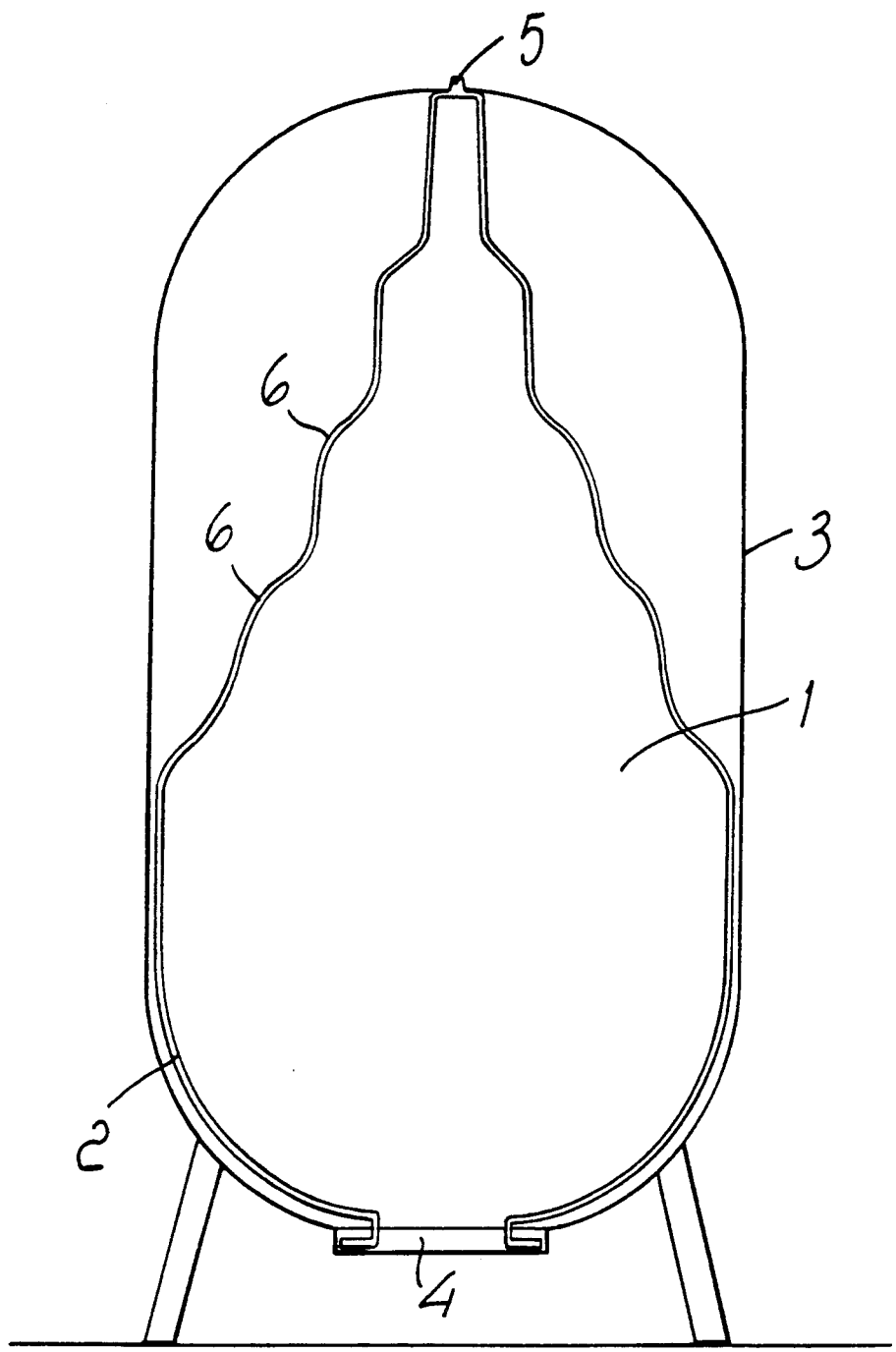
FIG. 1 is a schematic view of the subject membrane assembled in its respective holding vessel.
Figure 2:
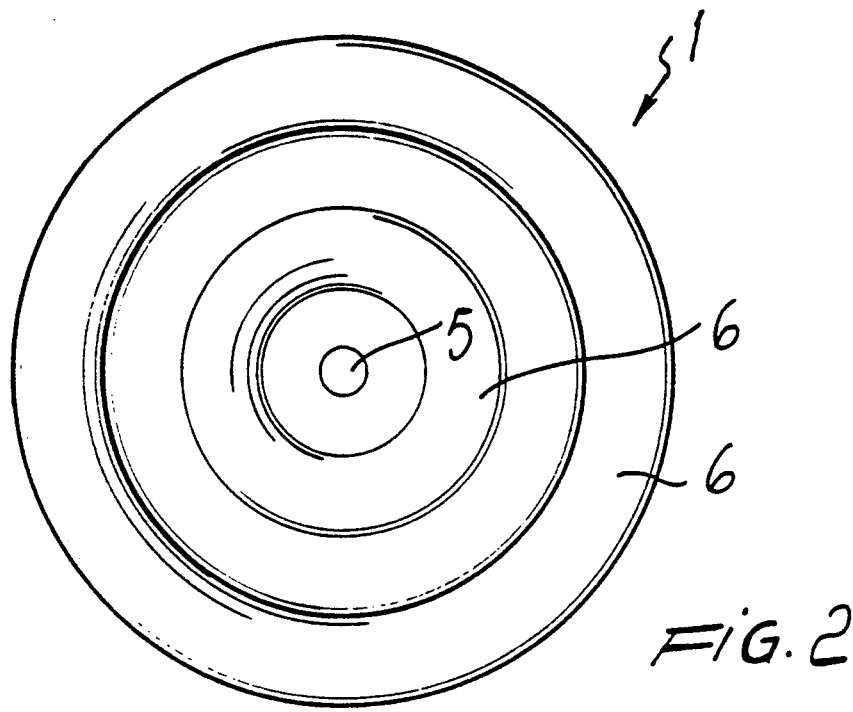
FIGS. 2 and 3 are respectively a top plan view and an elevation view showing the subject membrane in its free condition.
Figure 3:
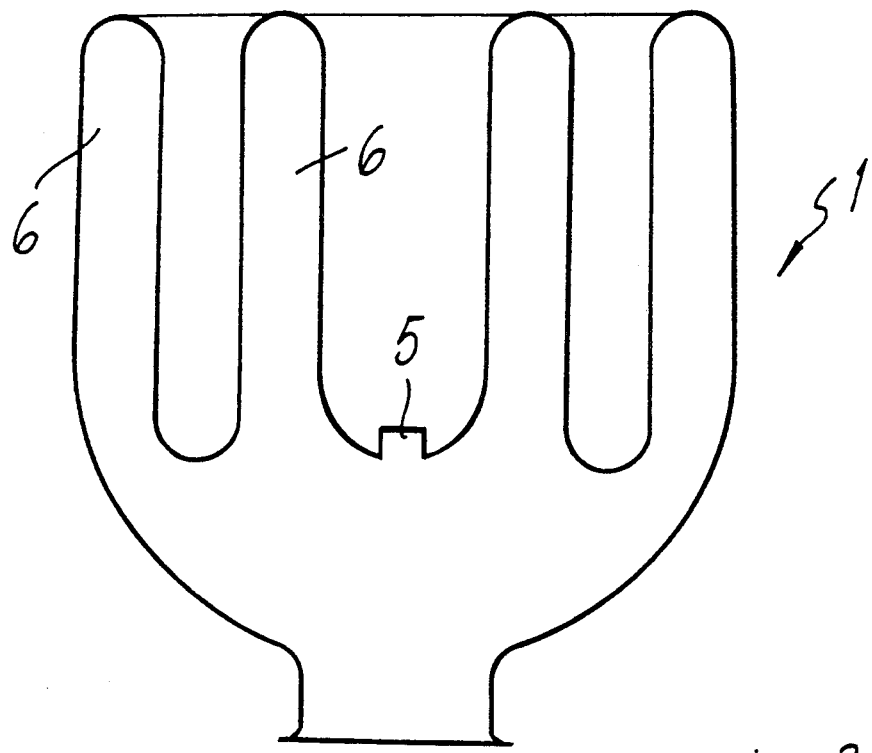

With reference to the figures of the accompanying drawings, the high capacity autoclave membrane according to the present invention, which has been generally indicated at the reference number 1, comprises a bottom portion 2 so designed and arranged as to fit to the corresponding bottom portion of the vessel 3.

As shown, the membrane 1 is also provided, like the conventional membranes, with a flange 4 therethrough water can pass, as well as with a top hole 5 for connecting the membrane to the autoclave vessel.

More specifically, the mentioned bottom portion of the membrane upwardly extends by concentric tubular lugs 6.

Figure 4:
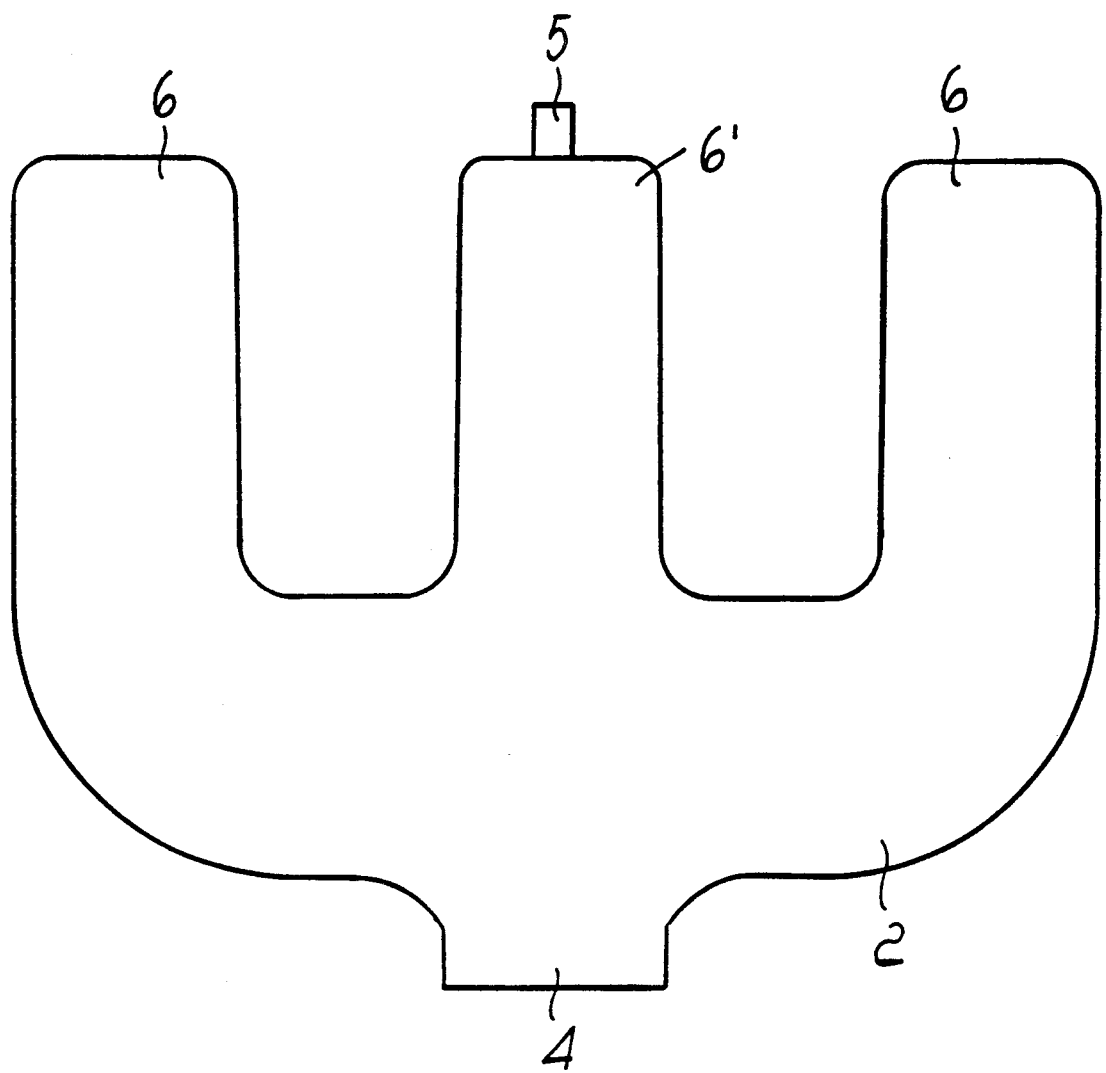
FIG. 4 is a further elevation view showing a modified membrane according to the invention.

Of the above lugs, in particular, the central lug 6', if it is provided, (as shown in FIG. 4), has a cylindric cross-section, whereas the outer lugs have correspondingly increasing annular cross-sections.

Moreover, the top portion of the membrane has a thickness which is suitably increased in the tapering direction of said top portion, as clearly shown in FIG. 1, so as to provide the membrane with suitable load or weight supporting properties.

In this connection it should be pointed out that the volume of the membrane according to the present invention is nearly the optimum volume, since it has been so designed that, as the autoclave operates, the membrane will receive all of the water which it can contain, while preventing the membrane from expanding.

Thus, the membrane will operate exclusively under pressure and it will be not stretched or dynamically stressed as it would occur if the membrane would be expanded so as to contact the bottom of the vessel.

From the above disclosure it should be apparent that the invention fully achieves the intended aim and objects.

While the invention has been disclosed and illustrated with reference to a preferred embodiment thereof, it should be apparent that the disclosed embodiment is susceptible to several modifications and variations all of which will come within the spirit and scope of the appended claims.

We claim:

1. A high capacity autoclave membrane disposed in an autoclave vessel having a flange and top hole for connecting the membrane to said autoclave vessel, wherein said membrane comprises an elastomeric hollow membrane body provided with a bottom portion having substantially a same size as a bottom of the autoclave vessel and a top portion including a plurality of inner and outer, upwardly extending tubular lugs, said elastomeric hollow membrane body consisting of an injection molded piece.

2. A membrane according to claim 1, wherein said membrane comprises a plurality of concentric tubular lugs extending from said bottom portion.

3. A membrane according to claim 2, wherein said concentric tubular lugs have a substantially annular configuration with diameters which outwardly increase.

4. A membrane according to claim 1, wherein said membrane comprises a substantially cylindric axially extending tubular lug.

5. A membrane according to claim 1, wherein said tubular lugs have different thicknesses and the inner lugs have the greatest thickness.

6. A membrane according to claim 1, wherein said membrane comprises a top hole for connection to said vessel.

* * * * *